(12) United States Patent
Winter et al.

(10) Patent No.: US 8,209,953 B2
(45) Date of Patent: Jul. 3, 2012

(54) GAS TURBINE ENGINE SYSTEM PROVIDING SIMULATED BOUNDARY LAYER THICKNESS INCREASE

(75) Inventors: Michael Winter, New Haven, CT (US); Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/963,667

(22) Filed: Dec. 9, 2010

(65) Prior Publication Data

US 2011/0072828 A1    Mar. 31, 2011

Related U.S. Application Data

(62) Division of application No. 11/595,040, filed on Nov. 10, 2006, now Pat. No. 7,870,721.

(51) Int. Cl.
*F02K 3/02* (2006.01)

(52) U.S. Cl. ...................... 60/226.1; 137/15.1

(58) Field of Classification Search ................. 60/226.1, 60/785; 137/15.1; 415/914
See application file for complete search history.

(56) References Cited

U.S. PATENT DOCUMENTS

| | | |
|---|---|---|
| 2,948,111 A | 5/1955 | Nelson |
| 2,915,262 A | 12/1959 | Klein |
| 3,059,878 A | 10/1962 | Kerry et al. |
| 3,074,232 A | 1/1963 | Soyer |
| 3,119,581 A | 1/1964 | Trevaskis |
| 3,222,863 A | 12/1965 | Klees et al. |
| 3,298,637 A | 1/1967 | Lee |
| 3,422,624 A | 1/1969 | Brooks et al. |
| 3,524,611 A | 8/1970 | Frank |
| 3,532,100 A | 10/1970 | Hilton |
| 3,541,794 A | 11/1970 | Johnston et al. |
| 3,568,694 A | 3/1971 | Johnson |
| 3,575,259 A | 4/1971 | Wilkinson |
| 3,583,417 A | 6/1971 | Clark |
| 3,611,724 A | 10/1971 | Kutney |
| 3,618,699 A | 11/1971 | Evans |
| 3,623,328 A | 11/1971 | Pike |

(Continued)

FOREIGN PATENT DOCUMENTS

FR    980347    12/1950

(Continued)

OTHER PUBLICATIONS

Extended European Search Report for Application No. EP 07 25 4305 dated Aug. 19, 2011.

(Continued)

*Primary Examiner* — Louis Casaregola
*Assistant Examiner* — Phutthiwat Wongwian
(74) *Attorney, Agent, or Firm* — Carlson, Gaskey & Olds PC

(57) ABSTRACT

A gas turbine engine system for an aircraft includes a nacelle having a fan cowl with an inlet lip section and a core cowl, at least one compressor and at least one turbine, at least one combustor between the compressor and the turbine, a bleed passage, and a controller. The bleed passage includes an inlet for receiving a bleed airflow and an outlet that discharges the bleed airflow in an upstream direction from the outlet. The controller identifies an operability condition and selectively introduces the bleed airflow near a boundary layer of the inlet lip section in response to the operability condition.

8 Claims, 4 Drawing Sheets

U.S. PATENT DOCUMENTS

| | | | |
|---|---|---|---|
| 3,623,494 A | 11/1971 | Poucher | |
| 3,652,036 A | 3/1972 | Sans et al. | |
| 3,662,556 A | 5/1972 | Poucher et al. | |
| 3,664,612 A | 5/1972 | Skidmore et al. | |
| 3,699,682 A | 10/1972 | Kleckner | |
| 3,736,750 A | 6/1973 | Britt | |
| 3,763,874 A | 10/1973 | Wilde et al. | |
| 3,770,228 A | 11/1973 | Traksel et al. | |
| 3,905,566 A | 9/1975 | Anderson | |
| 4,007,891 A | 2/1977 | Sorensen et al. | |
| 4,012,013 A | 3/1977 | Ball et al. | |
| 4,044,973 A | 8/1977 | Moorehead | |
| 4,083,181 A | 4/1978 | Adamson | |
| 4,132,240 A | 1/1979 | Frantz | |
| 4,147,029 A | 4/1979 | Sargisson | |
| 4,154,256 A | 5/1979 | Miller | |
| 4,199,295 A * | 4/1980 | Raffy et al. | 415/115 |
| 4,220,171 A | 9/1980 | Ruehr et al. | |
| 4,475,702 A | 10/1984 | Cole | |
| 4,540,143 A | 9/1985 | Wang et al. | |
| 4,722,357 A | 2/1988 | Wynosky | |
| 4,738,416 A | 4/1988 | Birbragher | |
| 4,865,268 A | 9/1989 | Tracksdorf | |
| 4,899,958 A | 2/1990 | Horikawa | |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,014,933 A | 5/1991 | Harm et al. | |
| 5,058,617 A | 10/1991 | Stockman et al. | |
| 5,127,222 A | 7/1992 | Ream et al. | |
| 5,141,182 A | 8/1992 | Coffinberry | |
| 5,143,329 A | 9/1992 | Coffinberry | |
| 5,145,126 A | 9/1992 | Patilla | |
| 5,156,362 A | 10/1992 | Leon | |
| 5,177,957 A | 1/1993 | Grieb | |
| 5,261,227 A | 11/1993 | Giffin, III | |
| 5,284,012 A | 2/1994 | Laborie et al. | |
| 5,297,765 A | 3/1994 | Hughes et al. | |
| 5,351,476 A | 10/1994 | Laborie et al. | |
| 5,357,742 A | 10/1994 | Miller | |
| 5,361,828 A | 11/1994 | Lee et al. | |
| 5,447,283 A | 9/1995 | Tindell | |
| 5,568,724 A | 10/1996 | Lindner et al. | |
| 5,586,431 A | 12/1996 | Thonebe et al. | |
| 5,593,112 A | 1/1997 | Maier et al. | |
| 5,626,017 A | 5/1997 | Sattelmayer | |
| 5,725,182 A | 3/1998 | Valleroy | |
| 5,727,380 A | 3/1998 | Lardy et al. | |
| 5,732,547 A | 3/1998 | Olsen et al. | |
| 5,743,488 A | 4/1998 | Rolston et al. | |
| 5,803,410 A | 9/1998 | Hwang | |
| 5,813,625 A | 9/1998 | Hassan et al. | |
| 5,841,079 A | 11/1998 | Parente | |
| 5,934,611 A | 8/1999 | Tindell et al. | |
| 5,971,328 A | 10/1999 | Kota | |
| 5,987,880 A | 11/1999 | Culbetson | |
| 6,055,805 A | 5/2000 | El-Aini et al. | |
| 6,089,505 A | 7/2000 | Gruensfelder et al. | |
| 6,109,566 A | 8/2000 | Miller et al. | |
| 6,129,309 A | 10/2000 | Smith et al. | |
| 6,129,311 A | 10/2000 | Welch et al. | |
| 6,170,253 B1 | 1/2001 | Newton | |
| 6,179,251 B1 | 1/2001 | Tindell et al. | |
| 6,231,006 B1 | 5/2001 | Gruensfelder et al. | |
| 6,259,976 B1 | 7/2001 | Lemelson et al. | |
| 6,260,567 B1 | 7/2001 | Gruensfelder et al. | |
| 6,334,753 B1 | 1/2002 | Tillman et al. | |
| 6,340,135 B1 | 1/2002 | Barton | |
| 6,360,989 B1 | 3/2002 | Maguire | |
| 6,375,118 B1 | 4/2002 | Kibens et al. | |
| 6,379,110 B1 | 4/2002 | McCormick et al. | |
| 6,390,418 B1 | 5/2002 | McCormick et al. | |
| 6,471,477 B2 | 10/2002 | Hassan et al. | |
| 6,651,929 B2 | 11/2003 | Dionne | |
| 6,655,632 B1 | 12/2003 | Guptak et al. | |
| 6,698,691 B2 | 3/2004 | Porte | |
| 6,708,711 B2 | 3/2004 | Surply et al. | |
| 6,763,651 B2 | 7/2004 | Shmilovich et al. | |
| 6,764,043 B2 | 7/2004 | Sankrithi et al. | |
| 6,793,177 B2 | 9/2004 | Bonutti | |
| 6,971,229 B2 | 12/2005 | Lair | |
| 7,048,229 B2 | 5/2006 | Sanders et al. | |
| 7,048,230 B2 | 5/2006 | Meyer | |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,255,309 B2 | 8/2007 | Boldrin et al. | |
| 7,617,670 B2 | 11/2009 | Traux et al. | |
| 7,735,601 B1 | 6/2010 | Stieger et al. | |
| 7,739,865 B2 | 6/2010 | Prasad et al. | |
| 7,766,280 B2 | 8/2010 | Cloft et al. | |
| 7,802,760 B2 | 9/2010 | Webster | |
| 7,870,721 B2 | 1/2011 | Winter et al. | |
| 2004/0037162 A1 | 2/2004 | Flohr et al. | |
| 2004/0237534 A1 | 12/2004 | Webster et al. | |
| 2005/0060982 A1 | 3/2005 | Mani et al. | |
| 2005/0274103 A1 | 12/2005 | Prasad et al. | |
| 2006/0155432 A1 | 7/2006 | Brown | |
| 2007/0221788 A1 | 9/2007 | Meister | |
| 2008/0092548 A1 | 4/2008 | Morford et al. | |
| 2008/0112799 A1 | 5/2008 | Winter et al. | |
| 2008/0267762 A1 | 10/2008 | Jain et al. | |
| 2008/0283676 A1 | 11/2008 | Jain et al. | |
| 2008/0286094 A1 | 11/2008 | Jain | |
| 2009/0003997 A1 | 1/2009 | Jain et al. | |
| 2009/0008508 A1 | 1/2009 | Jain et al. | |
| 2009/0121083 A1 | 5/2009 | Jain | |

FOREIGN PATENT DOCUMENTS

| | | |
|---|---|---|
| GB | 1070458 | 6/1965 |
| GB | 1312619 | 4/1973 |
| GB | 1336724 | 11/1973 |
| GB | 1382809 | 2/1975 |

OTHER PUBLICATIONS

Extended European Search Report for Application No. EP 08 25 2429 mail Nov. 26, 2008.

Extended European Search Report for Application No. EP 08 25 1047 mailed Sep. 6, 2011.

Extended European Search Report for Application No. EP 08 25 3874 dated Jan. 25, 2012.

\* cited by examiner

GAS TURBINE ENGINE SYSTEM PROVIDING SIMULATED BOUNDARY LAYER THICKNESS INCREASE

CROSS REFERENCE TO RELATED APPLICATIONS

This application is a divisional application of U.S. patent application Ser. No. 11/595,040, which was filed on Nov. 10, 2006 now U.S. Pat. No. 7,870,721.

BACKGROUND

This disclosure generally relates to a gas turbine engine system.

In an aircraft gas turbine engine, such as a turbofan engine, air is pressurized in a compressor and mixed with fuel in a combustor for generating hot combustion gases. The hot combustion gases flow downstream through turbine stages and extract energy from the gas. In a two spool gas turbine engine, a high pressure turbine powers the high pressure compressor, while a low pressure turbine powers a fan section disposed upstream of the compressor and a low pressure compressor.

Combustion gases are discharged from the turbofan engine through a core exhaust nozzle and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust is provided from the combustion gases discharged through the core exhaust nozzle.

It is known in the field of aircraft gas turbine engines that the performance of the engine varies during diverse flight conditions experienced by the aircraft. An inlet lip section located at the foremost end of the nacelle is typically designed to enable operation of the engine and prevent the separation of airflow from the inlet lip section of the nacelle during diverse flight conditions. For example, the inlet lip section requires a "thick" inlet lip section design to support operation of the engine during specific flight conditions, such as cross-wind conditions, take-off and the like.

SUMMARY

A gas turbine engine system for an aircraft includes a nacelle having a core cowl and a fan cowl with an inlet lip section, at least one compressor and at least one turbine, at least one combustor between the compressor and the turbine, a bleed passage, and a controller. The bleed passage includes an inlet for receiving a bleed airflow and an outlet that discharges the bleed airflow in an upstream direction from the outlet. The controller identifies an operability condition and selectively introduces the bleed airflow near a boundary layer of the inlet lip section in response to the operability condition.

A method of increasing an effective boundary layer of a gas turbine engine of an aircraft includes sensing an operability condition of the aircraft, and selectively introducing a bleed airflow in an upstream direction near the effective boundary layer of an inlet lip section of a nacelle of the gas turbine engine in response to sensing the operability condition.

The various features and advantages of this disclosure will become apparent to those skilled in the art from the following detailed description. The drawings that accompany the detailed description can be briefly described as follows.

DETAILED DESCRIPTION

Figure 1:
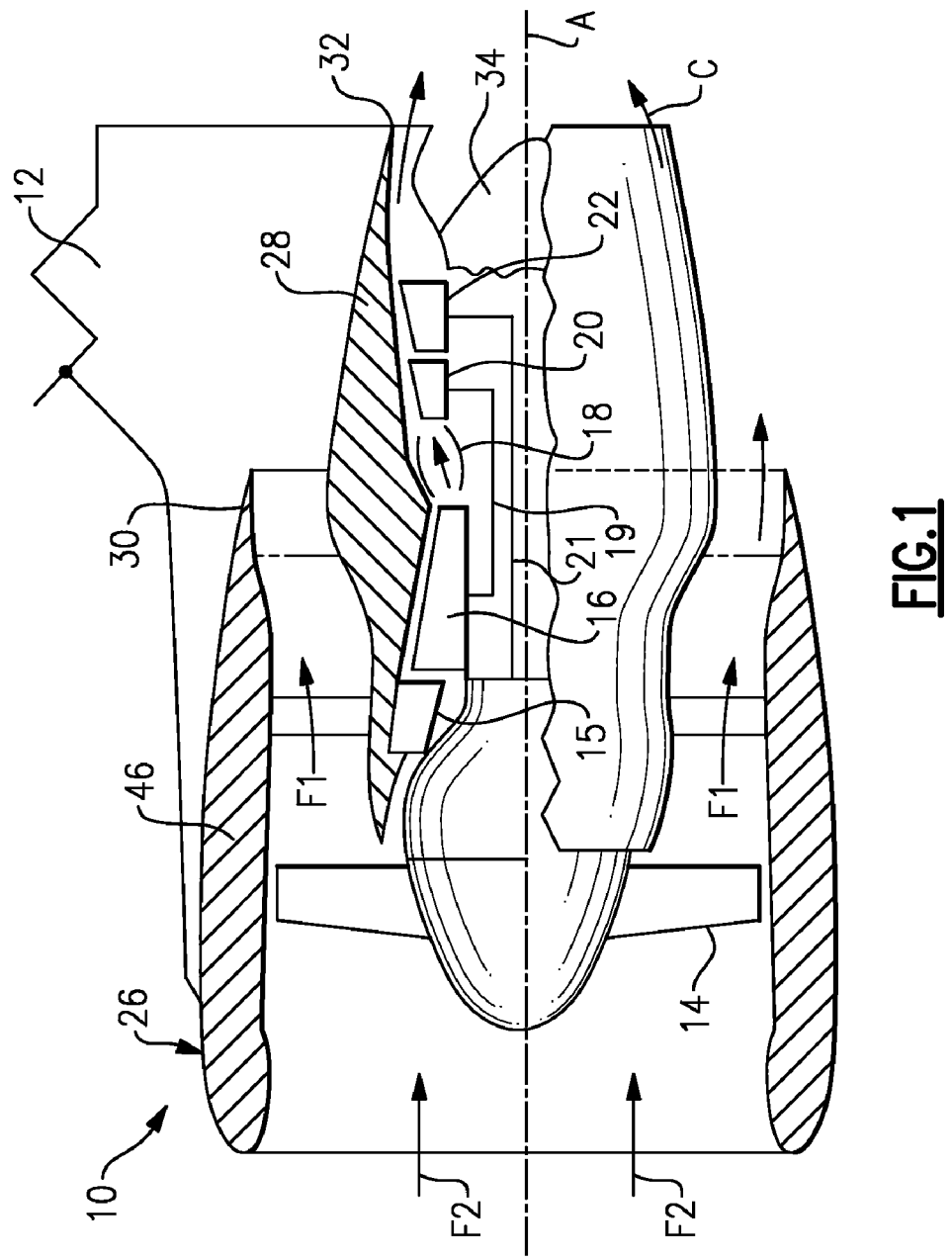
FIG. 1 illustrates a general perspective view of a gas turbine engine.

FIG. 1 illustrates a gas turbine engine 10 which includes (in serial flow communication) a fan section 14, a low pressure compressor 15, a high pressure compressor 16, a combustor 18, a high pressure turbine 20 and a low pressure turbine 22. During operation, air is pressurized in the compressors 15, 16 and mixed with fuel in the combustor 18 for generating hot combustion gases. The hot combustion gases flow through the high and low pressure turbines 20, 22, which extract energy from the hot combustion gases. The high pressure turbine 20 powers the high pressure compressor 16 through a high speed shaft 19 and a low pressure turbine 22 powers the fan section 14 and the low pressure compressor 15 through a low speed shaft 21. The disclosure is not limited to the two spool axial gas turbine architecture described and may be used with other architectures, such as a single spool axial design, a three spool axial design and other architectures.

The gas turbine engine 10 is in the form of a high bypass ratio turbofan engine mounted within a nacelle assembly 26, in which most of the air pressurized by the fan section 14 bypasses the core engine itself for the generation of propulsion thrust. The nacelle assembly 26 includes a fan cowl 46 and a core cowl 28 within the fan cowl 46. The fan cowl 46 and the core cowl 28 define outer flow surfaces of the nacelle assembly 26.

Discharge airflow F1 is discharged from the engine 10 through a fan exhaust nozzle 30 defined radially between the core cowl 28 and the fan cowl 46. Core exhaust gases C are discharged from the core engine through a core exhaust nozzle 32 defined between the core cowl 28 and a center plug 34 disposed coaxially therein around a longitudinal centerline axis A of the gas turbine engine 10.

Figure 2:
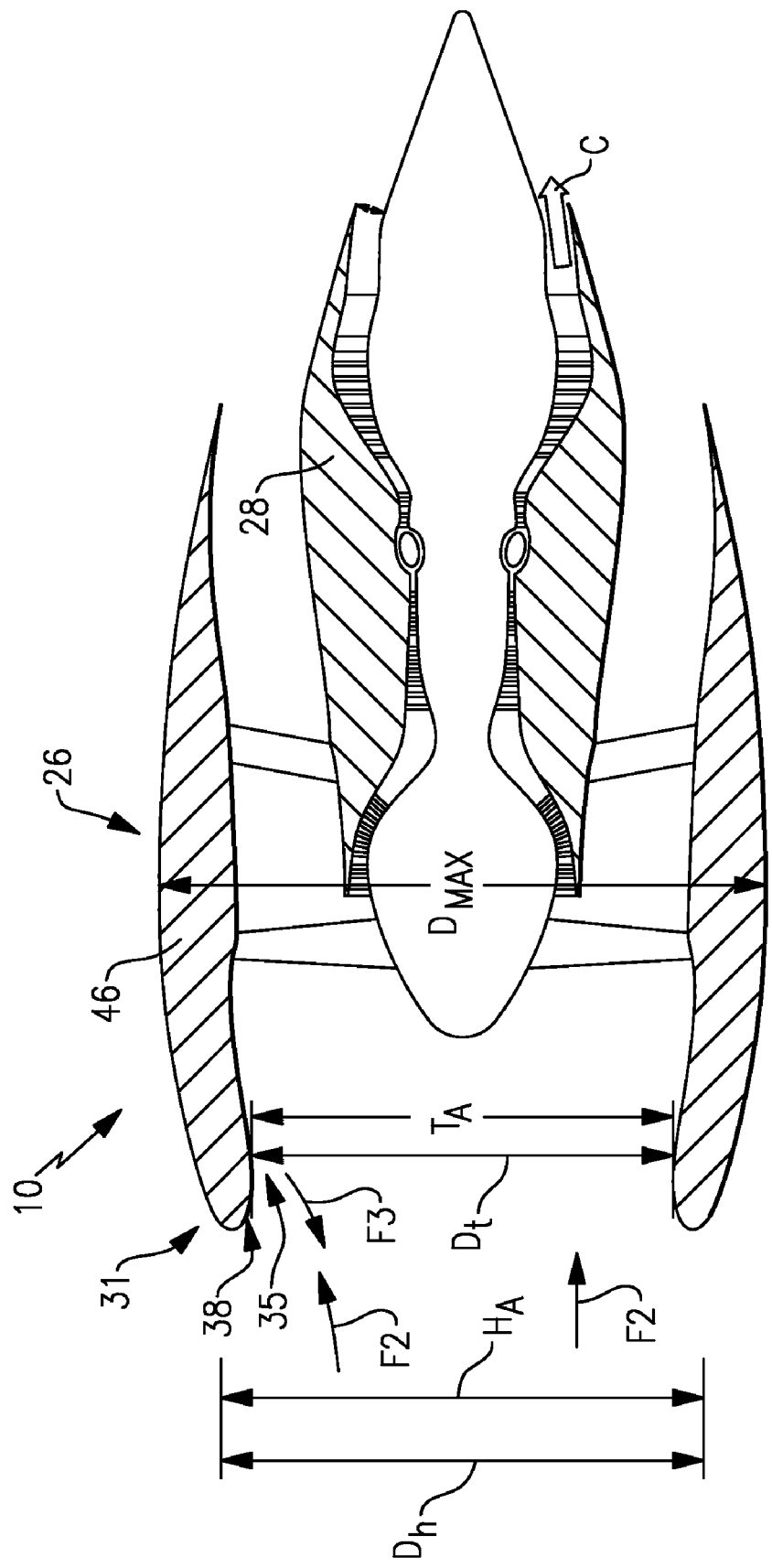
FIG. 2 illustrates a boundary layer of an inlet lip section of the gas turbine engine illustrated in FIG. 1.

FIG. 2 illustrates an example inlet lip section 38 of the nacelle assembly 26. The inlet lip section 38 is positioned near a forward segment 31 of the fan cowl 46. A boundary layer 35 is associated with the inlet lip section 38. The boundary layer 35 represents an area adjacent to a flow surface of the inlet lip section 38 where the velocity gradient of airflow is zero. That is, the velocity profile of incoming airflow F2 goes from a free steam away from the boundary layer 35 to near zero at the boundary layer 35.

The nacelle assembly 26 also defines a contraction ratio. The contraction ratio represents a relative thickness of the inlet lip section 38 of the nacelle assembly 26 and is represented by the ratio of a highlight area $H_a$ (ring-shaped area defined by a highlight diameter $D_h$) and a throat area $T_a$ (ring-shaped area defined by throat diameter $D_t$) of the nacelle assembly 26. Current industry standards typically use a contraction ratio of approximately 1.300 to prevent the separation of the incoming airflow F2 from the fan cowl 46, but other contraction ratios may be feasible. "Thick" inlet lip section designs, which are associated with large contraction ratios, increase the maximum diameter Dmax and increase weight and the drag penalties associated with the nacelle assembly 26.

Increasing the thickness of the boundary layer 35 of the inlet lip section 38 during specific flight conditions slows the flow of incoming airflow F2 around inlet lip section 38, thereby simulating a "thick" inlet lip section 38 and enabling the nacelle assembly 26 to be designed with a reduced contraction ratio. In one example, the increased boundary layer 35 thickness is achieved by introducing a bleed airflow F3 at the boundary layer 35 of the inlet lip section 38 during the specific flight conditions, as is further discussed below.

Figure 3:
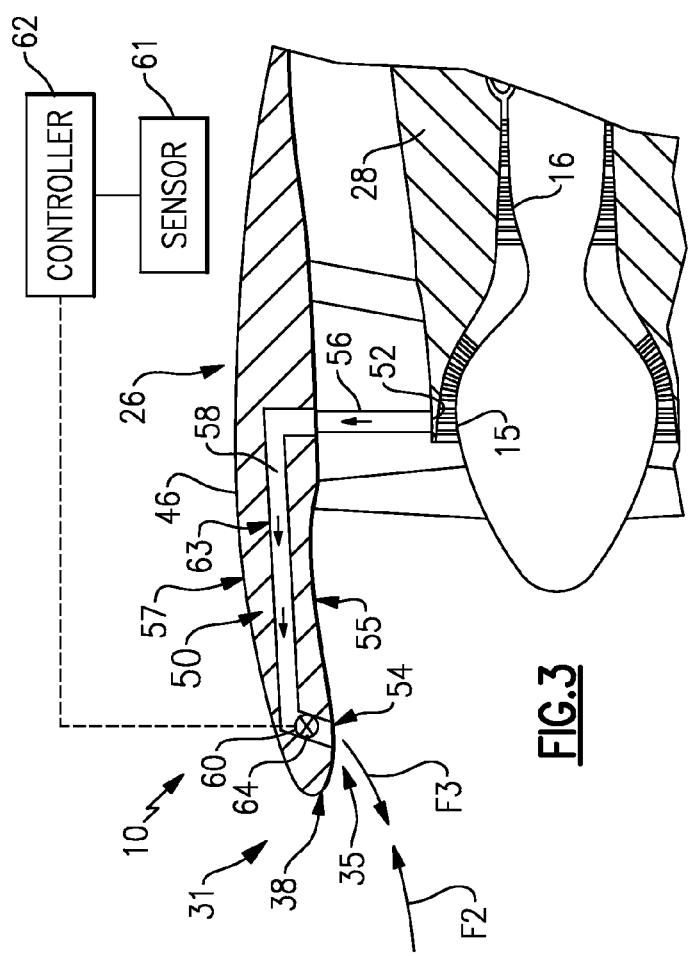
FIG. 3 illustrates a bleed passage of a gas turbine engine system shown in FIG. 1.

FIG. 3 illustrates an example bleed passage 50 of the gas turbine engine 10. The bleed passage 50 provides the bleed airflow F3 to the boundary layer 35 of the inlet lip section 38. The bleed passage 50 includes an inlet 52 for receiving the bleed airflow F3 and an outlet 54 for discharging the bleed airflow F3 near the boundary layer 35. In one example, the inlet 52 receives the bleed airflow from the lower pressure compressor 15. In another example, the inlet 52 receives the bleed airflow F3 from the high pressure compressor 16. It should be understood that the inlet 52 of the bleed passage 50 may receive the bleed airflow F3 from any location of the gas turbine engine 10.

Figure 4:
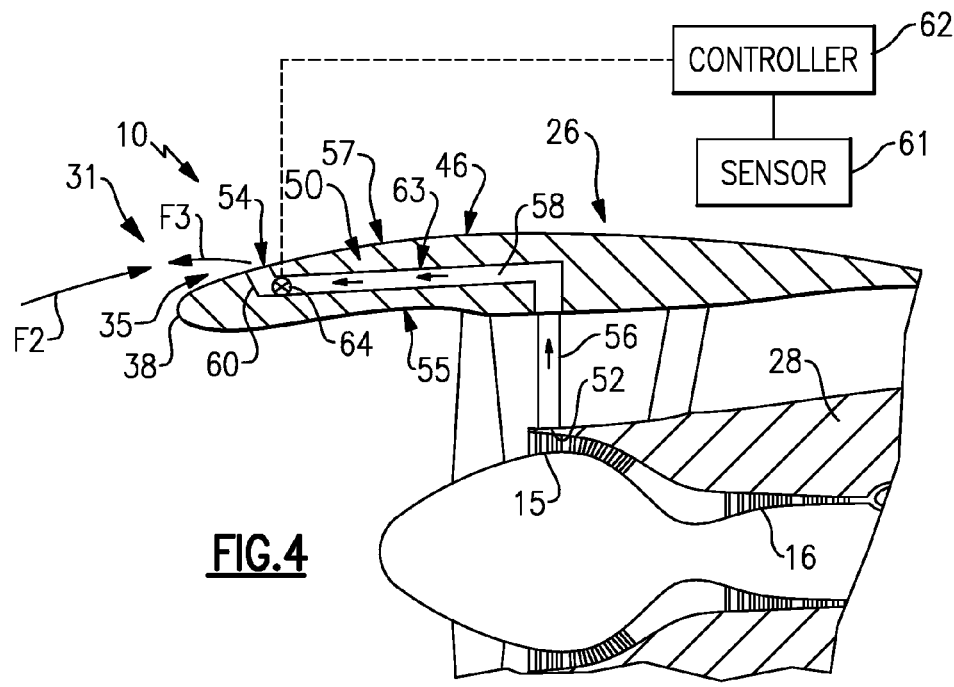
FIG. 4 illustrates another embodiment of the bleed passage of the gas turbine engine illustrated in FIG. 1.

In one example, the bleed airflow F3 is introduced at an interior wall 55 of the fan cowl 46 (See FIG. 3). In another example, the bleed airflow F3 is introduced at an exterior wall 57 of the fan cowl 46 (See FIG. 4). In yet another example, the bleed airflow F3 is introduced at both the interior wall 55 and the exterior wall 57 of the fan cowl 46 (See FIG. 5). It should be understood that bleed airflow F3 may be introduced anywhere along the nacelle assembly 26.

The bleed passage 50 includes a plurality of conduit sections 56, 58 and 60. In the illustrated examples shown in FIGS. 3-5, the conduit section 56 extends from the low pressure compressor section 15, through the core cowl 28, and through the fan cowl 46 of the nacelle assembly 26. The conduit section 58 extends within a cavity 63 within the fan cowl 46 of the nacelle assembly 26. The conduit section 60 extends between the conduit section 58 and the outlet 54 of the bleed passage 50. A worker of ordinary skill in the art having the benefit of this disclosure would be able to implement the conduit sections 56-60 of the bleed passage 50 within the existing structure of the gas turbine engine 10.

Figure 6:
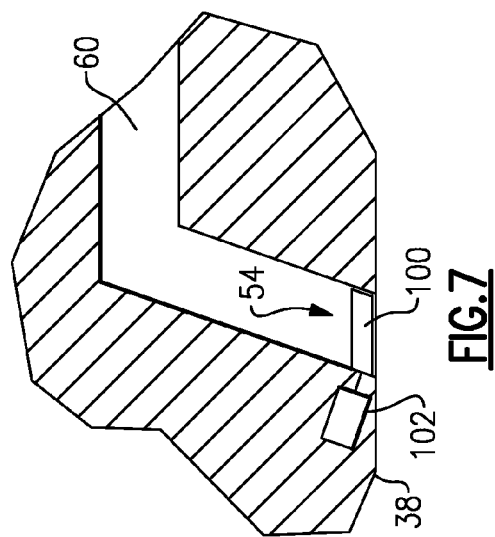
FIG. 6 illustrates a schematic view of a "thick" inlet lip section simulation.

The bleed airflow F3 is introduced at the boundary layer 35 in an upstream direction from the outlet 54. In one example, the bleed airflow F3 is introduced at the boundary layer 35 of the inlet lip section 38 in a direction directly opposite of the direction of the incoming airflow F2. Therefore, the incoming airflow F2 is forced to flow around the bleed airflow F3 being introduced at the boundary layer 35, thereby simulating a "thick" inlet lip section as required during certain flight conditions (See FIG. 6). In the disclosed embodiment, since the bleed airflow F3 is taken from the compressor 15, it will be at a relatively high pressure. In another example, the bleed airflow F3 is introduced at an angle relative to the incoming airflow F2. The actual direction and angle that the bleed airflow F3 is introduced at the boundary layer 35 will vary depending upon design specific parameters including, but not limited to, the size of the nacelle assembly 26 and the actual flight condition being experienced by the aircraft.

The increased thickness of the boundary layer 35 is achieved by introducing the bleed airflow F3 at the boundary layer 35 in response to a detected operability condition. A valve 64 is positioned within the bleed passage 50 and is controlled to selectively introduce the bleed airflow F3 at the boundary layer 35, in one example. In another example, the valve 64 is positioned directly adjacent to the outlet 54.

It should be understood that the bleed passages are not shown to the scale they would be in practice. Instead, they are shown larger than in practice to better illustrate their function. A worker in this art would be able to determine an appropriate bleed volume for a particular application, and the size of the bleed passages. Also, while a single outlet 54 is shown, of course, plural outlets would be spaced circumferentially such that the "thick" lip function occurs around the entire lip.

A sensor 61 detects the operability condition and communicates with a controller 62 to open the valve 64 and introduce the bleed airflow F3 at the boundary layer 35. Of course, this view is highly schematic. It should be understood that the sensor 61 and the controller 62 may be programmed to detect any known flight condition. Also, the sensor 61 can be replaced by any control associated with the gas turbine engine or an associated aircraft. In fact, the controller 62 itself can generate the signal to cause the actuation of the valve 64.

Figure 7:
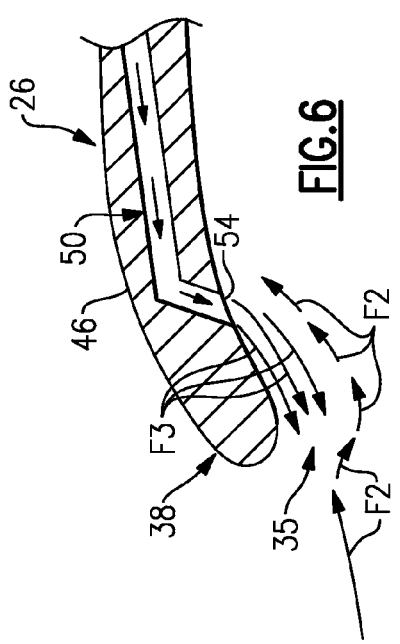
FIG. 7 shows another embodiment of the bleed passage.
Figure 5:
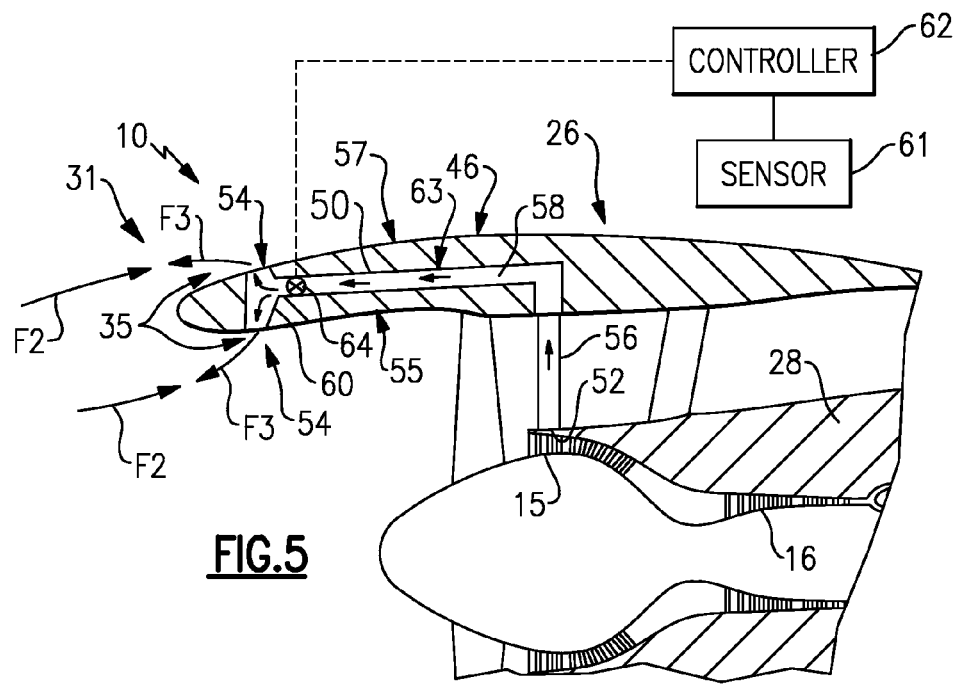
FIG. 5 illustrates yet another embodiment of the bleed passage of the gas turbine engine shown in FIG. 1.

In another example, shown in FIG. 7, the outlet 54 of the bleed passage 50 includes a flap assembly 100 which is pivotable about the outlet 54 to control the amount of bleed airflow F3 introduced at the inlet lip section 38. Of course, FIG. 5 is a schematic view. A person of ordinary skill in the art would know how to design appropriate actuation 102 and control systems to achieve comparable results with an alternative bleed passage design.

In one example, the operability condition includes a takeoff condition. In another example, the operability condition includes a climb condition. In another example, the operability condition includes a crosswind condition. Crosswind conditions are experienced during takeoff as an aircraft travels down the runway (i.e., where the aircraft experiences airflow in a roughly perpendicular direction with respect to the movement of the aircraft down the runway). In yet another example, the operability condition includes a windmilling condition. A windmilling condition occurs when an engine of a multi-engine aircraft losses functionality or is otherwise shut down (i.e., an engine-out condition). The damaged engine is advantageously permitted to rotate, and is driven by an airflow resulting from the forward velocity of the aircraft (i.e., the damaged engine is permitted to "windmill") It should be understood that the bleed airflow F3 may be introduced during any operability condition experienced by an aircraft during operation.

The controller 62 closes the valve 64 of the bleed passage 50 during normal cruise operation (e.g., a generally constant speed at generally constant, elevated altitude) of the aircraft. By simulating a "thick" inlet lip section during specific flight conditions, the aircraft may be designed having a "thin" inlet lip section 38 (i.e., a reduced contraction ratio is achieved). Therefore, efficiency is improved during normal cruise conditions. Further, by increasing the boundary layer 35 thickness of the inlet lip section 38 during diverse flight conditions, performance of the gas turbine engine 10 is maximized during each specific operability condition. As a result, the nacelle assembly 26 is designed per cruise conditions of the aircraft. A reduced maximum diameter of the nacelle assembly 26 may therefore be achieved while reducing weight, reducing fuel burn and increasing the overall efficiency of the gas turbine engine 10.

The foregoing description shall be interpreted as illustrative and not in any limiting sense. A worker of ordinary skill in the art would recognize that certain modifications would come within the scope of this disclosure. For that reason, the following claims should be studied to determine the true scope and content of this disclosure.

What is claimed is:

1. A gas turbine engine system for an aircraft, comprising:
a nacelle defined about an axis, wherein said nacelle includes a fan cowl having an inlet lip section and a core cowl disposed at least partially within said fan cowl;
at least one compressor and at least one turbine positioned downstream of said at least one compressor;
at least one combustor positioned between said at least one compressor and said at least one turbine;
a bleed passage having an inlet that receives a bleed airflow and an outlet that discharges said bleed airflow in an upstream direction that is directly opposite of a direction of incoming airflow from said outlet and near a boundary layer of said inlet lip section; and
a controller that identifies an operability condition of the aircraft, wherein said controller selectively introduces said bleed airflow near said boundary layer of said inlet lip section of said nacelle in response to said operability condition.

2. The system as recited in claim 1, comprising a valve positioned within said bleed passage, wherein said valve is actuated by said controller in response to said operability condition to introduce said bleed airflow.

3. The system as recited in claim 2, wherein said valve includes at least one flap assembly pivotally attached to said outlet and actuable to introduce said bleed airflow.

4. The system as recited in claim 1, wherein said operability condition includes at least one of a take-off condition, a climb condition, a cross-wind condition and a windmilling condition.

5. The system as recited in claim 1, wherein said bleed passage receives said bleed airflow from said at least one compressor.

6. The system as recited in claim 1, wherein said bleed airflow is selectively communicated to said bleed passage from a location separate from a high pressure compressor stage of said at least one compressor.

7. The system as recited in claim 3, comprising an actuator that selectively pivots said at least one flap assembly.

8. A gas turbine engine system for an aircraft, comprising:
a nacelle defined about an axis, wherein said nacelle includes a fan cowl having an inlet lip section and a core cowl disposed at least partially within said fan cowl;
at least one compressor and at least one turbine positioned downstream of said at least one compressor;
at least one combustor positioned between said at least one compressor and said at least one turbine;
a bleed passage having an inlet that receives a bleed airflow and an outlet that discharges said bleed airflow in an upstream direction from said outlet and near a boundary layer of said inlet lip section;
a controller that identifies an operability condition of the aircraft, wherein said controller selectively introduces said bleed airflow near said boundary layer of said inlet lip section of said nacelle in response to said operability condition; and
a valve positioned within said bleed passage, wherein said valve is actuated by said controller in response to said operability condition to introduce said bleed airflow, wherein said valve includes at least one flap assembly pivotally attached to said outlet and actuable to introduce said bleed airflow.

* * * * *